United States Patent [19]

Maemori et al.

[11] Patent Number: 4,544,249
[45] Date of Patent: Oct. 1, 1985

[54] INCORRECT LENS SETTING DETECTION DEVICE FOR WIDE-ANGLE/TELEPHOTOGRAPHY CONVERTIBLE CAMERA

[75] Inventors: Takashi Maemori; Kazuo Kamata, both of Tokyo, Japan

[73] Assignee: Fuji Photo Film Co., Ltd., Kanagawa, Japan

[21] Appl. No.: 657,406

[22] Filed: Oct. 3, 1984

[30] Foreign Application Priority Data

Oct. 3, 1983 [JP] Japan .......................... 58-152040[U]

[51] Int. Cl.[4] .............................................. G03B 3/00
[52] U.S. Cl. ................................ 354/195.12; 354/268
[58] Field of Search ...................... 354/195.12, 195.13, 354/268, 412, 289.1, 289.12

[56] References Cited

U.S. PATENT DOCUMENTS 3,836,934 9/1974 Suzuki et al. ................... 354/195.12
3,903,537 9/1975 Ettischer ........................ 354/195.12

Primary Examiner—William B. Perkey
Attorney, Agent, or Firm—Young & Thompson

[57] ABSTRACT

A camera has first and second switches which turn ON/OFF in association with a wide-angle/telephotography changeover member. The first switch turns ON when the wide-angle/telephotography changeover member is in the wide-angle position, and the second switch turns ON when the wide-angle/telephotography changeover member is in the telephoto position. An incorrect lens setting signal is generated when both the first and the second switches are OFF. Upon generation of the incorrect lens setting signal, an incorrect position display is actuated and the operation of the camera is stopped.

9 Claims, 4 Drawing Figures

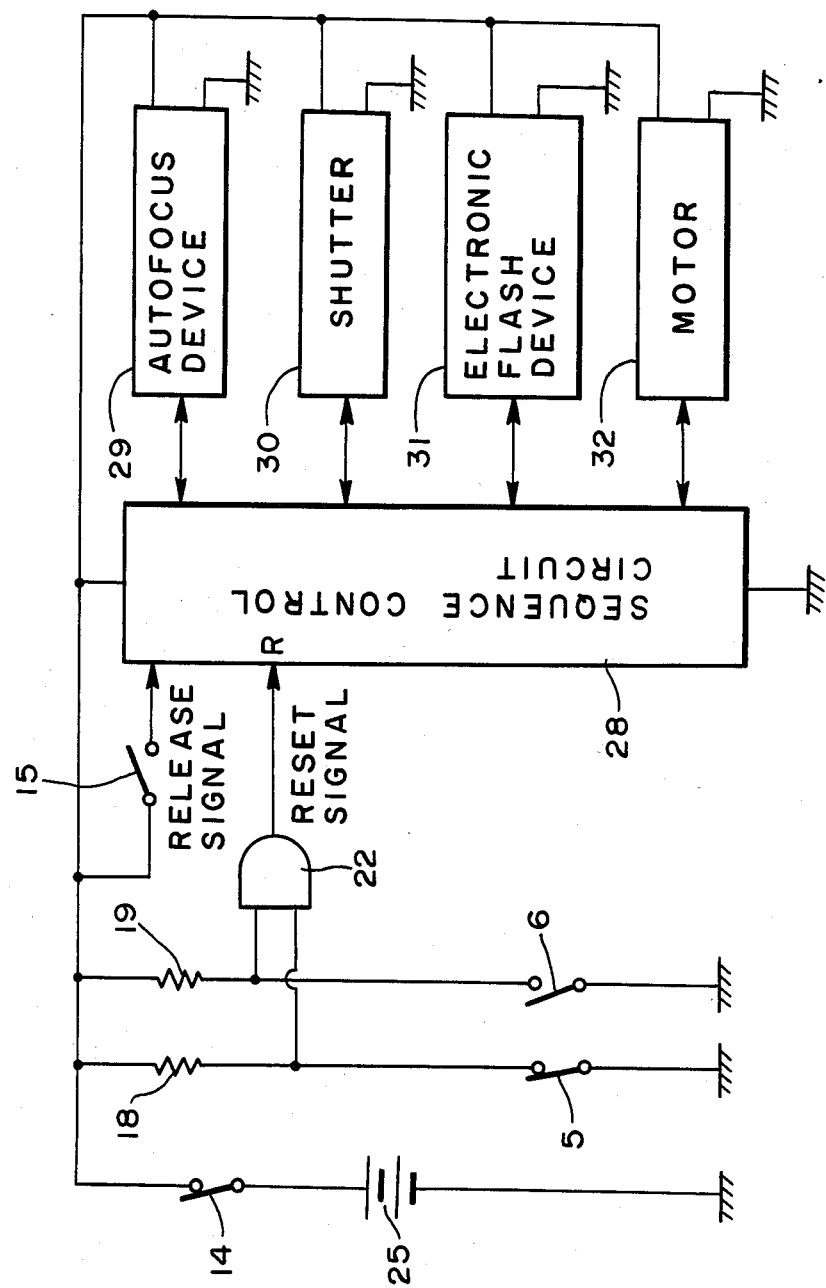

INCORRECT LENS SETTING DETECTION DEVICE FOR WIDE-ANGLE/TELEPHOTOGRAPHY CONVERTIBLE CAMERA

BACKGROUND OF THE INVENTION

The present invention relates to a wide-angle/telephotography convertible camera which can selectively perform either wide-angle photography or telephotography, and more particularly it relates to a device which generates an incorrect lens setting signal when a wide-angle/telephotography changeover member is not correctly set in the wide-angle position or the telephoto position.

Wide-angle/telephotography convertible cameras, which can selectively perform either wide-angle photography or telephotography, are widely known in the art. The wide-angle/telephotography convertible camera can be of one kind in which a conversion lens is disposed so as to move in or out of the optical train behind a main lens, or of another kind in which a wide-angle lens and a telephoto lens are juxtaposed and the path of the received light is switched by moving a mirror disposed in front of the film.

With wide-angle/telephotography convertible cameras of these kinds, the photographic image cannot be formed at a correct position on the film unless the wide-angle/telephotography changeover manipulable member for moving the conversion lens or the mirror is in the correct position. It is known in the art (for example, Japanese Patent Laid-open Publication No. 53-14931) that a cam mechanism moving in association with the positioning mechanism of a conversion lens can be provided so that when the lens is not correctly positioned, a red filter is inserted into the optical path of the viewfinder to give an indication of incorrect lens setting. However, cameras using such a mechanism have the problem that the structure is complicated and the manufacturing cost is high.

OBJECT OF THE INVENTION

It is therefore a principal object of the present invention to provide a camera which can detect the inaccuracy of lens setting with a simple device having a simple structure.

It is another object of the present invention to provide a camera in which an indication is given in the case of inaccurate lens setting.

Finally, it is an object of the present invention to provide a camera in which the sequence control of the camera mechanism is stopped in the case of inaccurate lens setting.

SUMMARY OF THE INVENTION

In order to achieve the above objects, the present invention provides a first switch for detecting that the wide-angle/telephotography changeover member is positioned in the wide-angle position, and a second switch for detecting that the wide-angle/telephotography changeover member is positioned in the telephoto position. Whether the lens is correctly set or not is judged from the ON/OFF state of both switches. If the lens is not correctly set, an incorrect lens setting signal is generated.

The wide-angle/telephotography changeover member may comprise any of a number of combinations of a wide-angle/telephotography changeover manipulable member such a changeover ring or changeover button, mounted on the camera body, and a member moving in association with the manipulable member, plus a holder movable by that member and holding a mirror for switching light ray path, or a holder movable by that member and holding a conversion lens for movement into or out of the optical path of the main lens, and the like.

In the present specification, the invention will be described in connection with wide-angle/telephotography; however, these terms are somewhat relative, and any other combinations such as wide-angle/standard photography, or standard/telephotography may also be adopted. Furthermore, the present invention can be applied to any of a variety of types of camera: a type in which wide-angle photography and telephotography can be selectively performed by inserting a conversion lens behind the main lens, and another type in which a wide-angle lens and a telephoto lens are juxtaposed, and a light ray passing through a desired one of the lenses falls on the film by switching a mirror that is behind the lenses.

BRIEF DESCRIPTION OF THE DRAWINGS

FIG. 4 is a block circuit diagram of an embodiment of camera according to the invention, in which the photographic sequence is caused to stop upon the detection of incorrect lens setting.

DETAILED DESCRIPTION OF THE INVENTION

Figure 1:
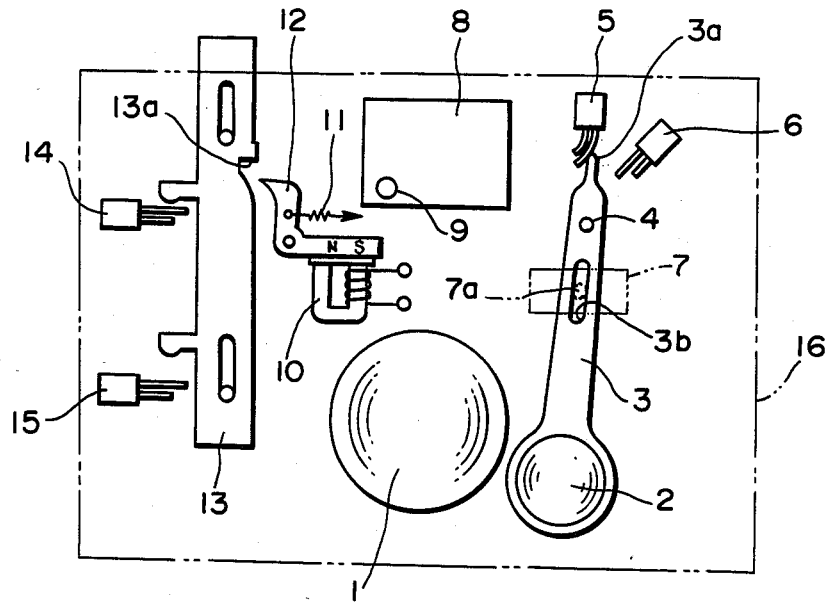
FIG. 1 is a schematic front view of a camera according to the present invention, in which a teleconversion lens is shown in its wide-angle position.
Figure 2:
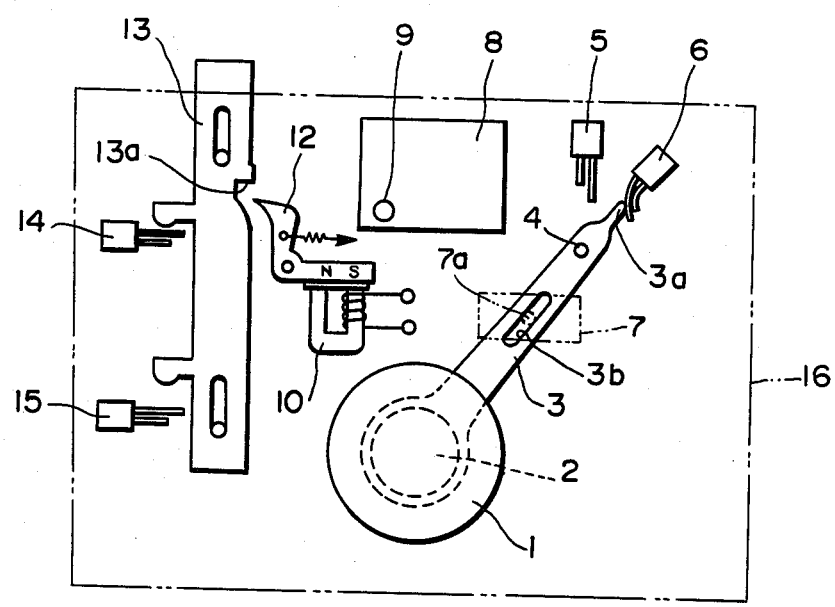
FIG. 2 is a view similar to FIG. 1 but in which the teleconversion lens is shown in its telephoto position.

FIGS. 1 and 2 show a camera to which the present invention is applied and which can selectively perform either wide-angle photography or telephotography by using a teleconversion lens. The teleconversion lens 2 is disposed behind the main or taking lens 1 so as to move freely into or out of the light ray path of the main lens 1. The teleconversion lens 2 is held in a holder 3 and swings about an axis 4 when a wide-angle/telephotography changeover manipulable member 7 provided on camera body 16 is operated. Member 7 carries a pin 7a that engages in an elongated slot 3b in the holder 3. When member 7 is manipulated, pin 7a slides in slot 3b to swing holder 3 in either direction between the positions of FIGS. 1 and 2.

As is shown in FIG. 1, when the teleconversion lens 2 is set at the wide-angle position entirely spaced from the optical axis of the main lens 1, a contact of a first switch 5 is closed to turn the switch ON by means of a protuberance 3a of the holder 3. If on the other hand a normally-closed type switch is used, the first switch 5 turns OFF when the teleconversion lens 2 is set at the wide-angle position.

As shown in FIG. 2, when the teleconversion lens 2 is set at the telephoto position on the optical axis of the main lens 1, a second normally-open switch 6 turns ON. If the teleconversion lens 2 is not correctly positioned in either the wide-angle position or the telephoto position, but instead remains in an intermediate position, then both first switch 5 and second switch 6 remain OFF. In this case, an incorrect lens setting signal is generated, thereby to cause the display of an incorrect position indication by illuminating a light-emitting diode 9, as will be described later. Also, at the same time, a magnet 10 is energized and develops an opposing force against a permanent magnet attached to a lock lever 12 so that the lock lever 12 rotates counter-clockwise against the force of a tension spring 11. Upon the counter-clockwise rotation of the lock lever 12, lever 12 enters a notch 13a of a shutter release lever 13 to prevent lever 13 from being pushed down. The shutter release lever 13 makes a power switch 14 turn ON during a first portion of the stroke thereof, and as is well known in the art thereby makes the light-measuring circuit and auto-focussing circuit operate. The release lever 13 makes a shutter release switch 15 turn ON during a second portion of the stroke thereof, which makes the shutter operate to start photographing.

Figure 3:
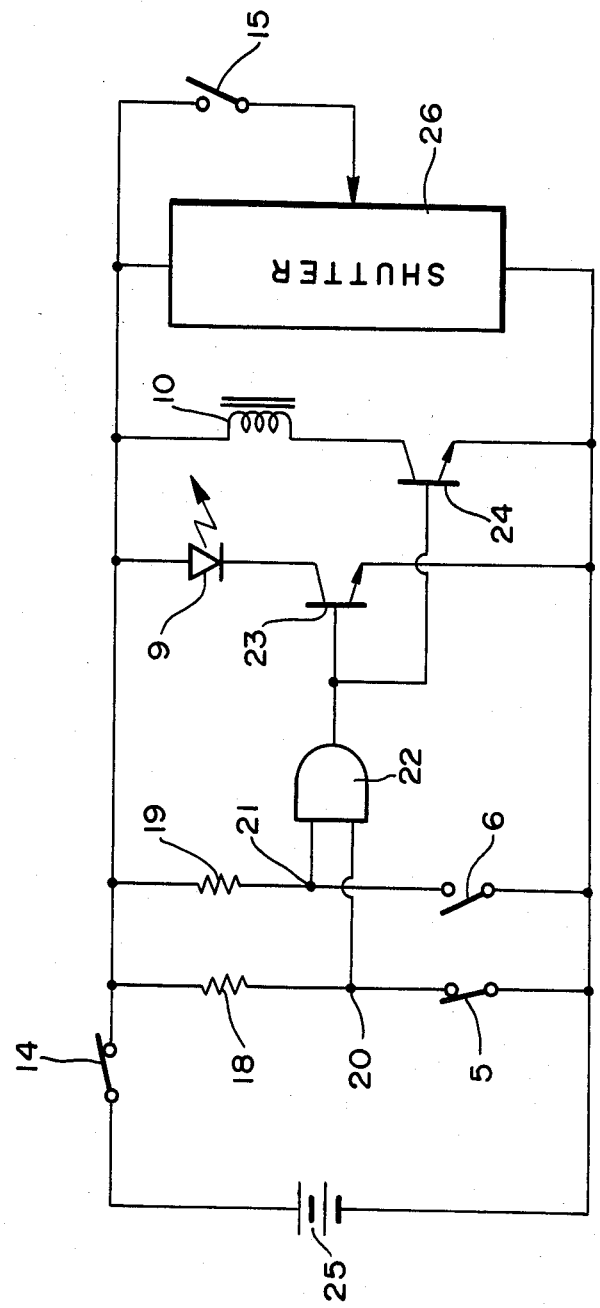
FIG. 3 is a circuit diagram showing the electrical circuit of a camera according to the present invention.

FIG. 3 shows an electrical circuit diagram of a camera according to the present invention. The first switch 5 and the second switch 6 are respectively in series with resistors 18 and 19, and the connection points 20 and 21 are respectively connected to input terminals of an AND circuit 22. The output terminals of the AND circuit 22 have respective transistors 23 and 24 connected thereto. When the transistors 23 and 24 turn ON, the light emitting diode 9 and the magnet 10 are energized, the power being supplied by an electric cell 25.

When the teleconversion lens 2 is correctly set either in the wide-angle position or in the telephoto position, the corresponding one of the first switch 5 and the second switch 6 will be ON. Upon depression of the shutter release lever 13, the power switch 14 turns ON during the first part of the stroke of the release lever 13, and each circuit element described so far is supplied with power. Assuming the teleconversion lens 2 is correctly set, the output of the AND circuit 22 remains "L". Therefore, since the transistors 23 and 24 are OFF, the light emitting diode 9 is off and the magnet 10 is not energized. When the release lever 13 is further depressed, the shutter release switch 15 turns ON during the second part of the stroke of the release lever 13 so that the shutter 26 operates and the exposure beings.

If the teleconversion lens 2 is not correctly set in either the wide-angle position or the telephoto position, but instead is in an intermediate position therebetween, both the first switch 5 and the second switch 6 will be OFF. In this case, the output of the AND circuit 22 becomes "H" and the light emitting diode 9 is illuminated to constitute an incorrect position display. At the same time, since the magnet 10 is energized, the release lever 3 is locked by lock lever 12 to prevent the second increment of movement of release lever 13 and hence to prevent opening of the shutter.

FIG. 4 shows an embodiment in which the photographing sequence is not executed if the conversion lens is not set in a correct position. In the figure, the parts that are substantially similar to those in FIG. 3 have been indicated by identical numbers. First, the condition in which the conversion lens 2 is correctly set will be described. When the power switch 14 turns ON upon the depression of the release lever 13 during the first increment of its stroke, the output of the AND circuit will be "L" as previously described. Therefore, no reset signal is generated. Next, upon the depression of the release lever 13 during the second increment of its stroke, the release switch 15 is turned ON so that a sequence control circuit 28 executes the sequence control. According to the sequence thus initiated, an auto-focussing device 29 is first caused to operate, thereby effecting the focussing control of the taking lens. After detecting the completion of the focussing control, the shutter 30 is made to operate and to start exposing the film, simultaneously with the flashing of an electronic flash device 31. After detecting the closing of the shutter 30, a motor 32 is rotated to roll up the film and to charge the shutter 30, and thereafter, charging of the electronic flash device 31 is started.

But if the conversion lens 2 is not correctly set, the power switch 14 turns ON upon the first increment of the stroke of the release lever 13, and the output of the AND circuit 22 becomes "H" as described previously. This output is input as a reset signal to the sequence control circuit 28. Upon reception of the reset signal, the sequence control circuit 28 returns to the start location of its program so that the above photographing sequence is not executed.

While there has been described what are at present considered to be preferred embodiments of the invention, it will be understood that various modifications may be made therein, and it is intended to cover in the appended claims all such modifications as fall within the true spirit and scope of the invention.

What is claimed is:

1. A camera selectively performing either wide-angle photography or telephotography, comprising:
   a wide-angle/telephotography changeover member mounted on the camera for movement between a wide-angle position to set the wide-angle photography mode of the camera and a telephoto position to set the telephotography mode of the camera;
   a first switch for detecting when said wide-angle/telephotography changeover member is correctly set in said wide-angle position;
   a second switch for detecting when said wide-angle/telephotography changeover member is correctly set in said telephoto position; and
   detecting means for detecting whether said wide-angle/telephotography changeover member is correctly set either in said wide-angle position or in said telephoto position, depending on the ON/OFF state of said first and second switches, said detecting means generating an incorrect lens setting signal when said wide-angle/telephotography changeover member is not correctly set.

2. A camera as claimed in claim 1, in which said detecting means generates said incorrect lens setting signal when the ON/OFF states of said first and second switches are the same.

3. A camera as claimed in claim 2, in which said detecting means is an AND circuit.

4. A camera as claimed in claim 1, and a main lens fixed on the optical path of the camera, and a conversion lens movable by said changeover member into and out of said optical path.

5. A camera as claimed in claim 4, and a holder for holding said conversion lens, and in which said first and second switches are turned ON by being contacted by a portion of said holder.

6. A camera as claimed in claim 1, and a display for displaying a luminous indication of an incorrect lens setting responsive to said incorrect lens setting signal.

7. A camera as claimed in claim 6, in which said display is mounted within a viewfinder on the camera.

8. A camera as claimed in claim 1, and lock means for preventing a shutter release operation, said lock means being actuated by said incorrect lens setting signal.

9. A camera as claimed in claim 1, and means for sequentially controlling the camera mechanism, said means stopping the execution of a photographing sequence so as not to start taking a photograph when said incorrect lens setting signal is generated.

* * * * *